(12) United States Patent
Wan et al.

(10) Patent No.: US 7,463,127 B2
(45) Date of Patent: Dec. 9, 2008

(54) MAGNETORESISTIVE SMART SWITCH

(75) Inventors: Hong Wan, Plymouth, MN (US); Edgar R. Mallison, Wayzata, MN (US); Michael L. Freeman, St. Paul, MN (US)

(73) Assignee: Honeywell International Inc., Morristown, NJ (US)

( * ) Notice: Subject to any disclaimer, the term of this patent is extended or adjusted under 35 U.S.C. 154(b) by 387 days.

(21) Appl. No.: 11/077,725

(22) Filed: Mar. 11, 2005

(65) Prior Publication Data

US 2005/0156591 A1 Jul. 21, 2005

Related U.S. Application Data

(63) Continuation of application No. 10/294,105, filed on Nov. 14, 2002, now Pat. No. 6,960,974.

(51) Int. Cl.
*H01F 7/00* (2006.01)
*H01H 9/00* (2006.01)
(52) U.S. Cl. .................. 335/215; 340/547; 335/207
(58) Field of Classification Search ......... 335/205–207, 335/215; 340/547; 324/207.21
See application file for complete search history.

(56) References Cited

U.S. PATENT DOCUMENTS

| | | | |
|---|---|---|---|
| 4,818,939 A | 4/1989 | Takahashi et al. | |
| 5,358,088 A | 10/1994 | Barnes et al. | |
| 5,596,272 A | 1/1997 | Busch | |
| 5,722,706 A * | 3/1998 | Bartel et al. | 292/216 |
| 5,862,691 A | 1/1999 | Friedrich et al. | |
| 6,060,969 A | 5/2000 | Hufgard et al. | |
| 6,100,682 A | 8/2000 | Schroeder | |
| 6,310,549 B1 | 10/2001 | Loftin et al. | |
| 6,313,625 B1 * | 11/2001 | Varady et al. | 324/207.25 |
| 6,611,790 B1 | 8/2003 | Reichl et al. | |
| 2003/0030521 A1 | 2/2003 | Sweet et al. | |
| 2004/0130315 A1 | 7/2004 | Lamb et al. | |
| 2004/0217832 A1 * | 11/2004 | Lamb et al. | 335/205 |

OTHER PUBLICATIONS

AN211—Applications of Magnetic Position Sensors, Honeywell, XP-002272126, Solid State Electronics Center—www.magneticsensors.com, 8 pages.
HMR 4007—Linear Position Sensor Module, Honeywell, XP-002272127, Solid State Electronics Center—www.magneticsensors.com, 4 pgs.
Linear/Angular/Rotary Displacement Sensors HMC1501/HMC1512, Honeywell, XP-002272125, 4 pages.
HMC1051Z/HMC1052—1 and 2-Axis Magnetic Sensors, Honeywell, XP-002272124, Solid State Electronics Center—www.magneticsensors.com, 8 pages.

* cited by examiner

*Primary Examiner*—Elvin G Enad
*Assistant Examiner*—Bernard Rojas
(74) *Attorney, Agent, or Firm*—McDonnell Boehnen Hulbert & Berghoff LLP

(57) ABSTRACT

A smart switch has a magnetic operator, at least one magnetic sensor located to sense movement of the magnetic operator, and a processor that processes an output of the magnetic sensor so as to detect right and left over travel ranges and a normal operating range of the magnetic operator. The magnetic sensor may be a magnetoresistive sensor.

21 Claims, 4 Drawing Sheets

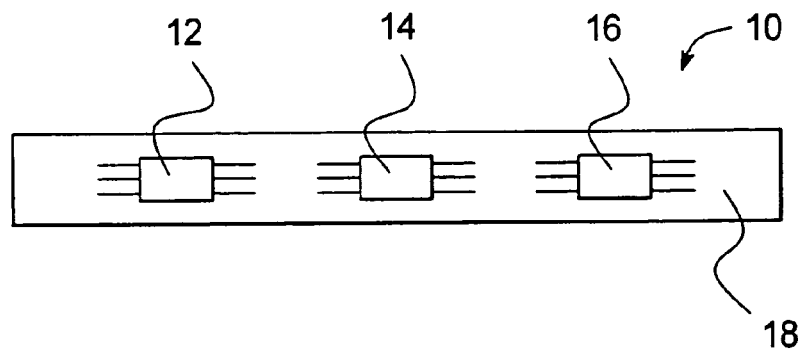
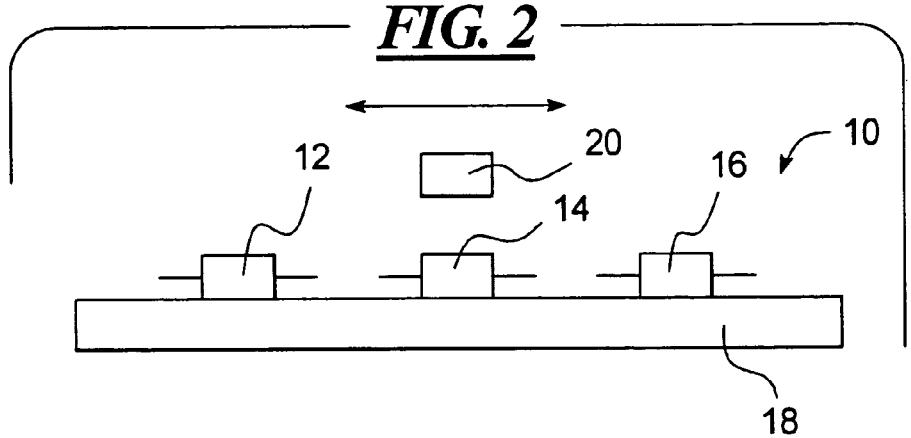
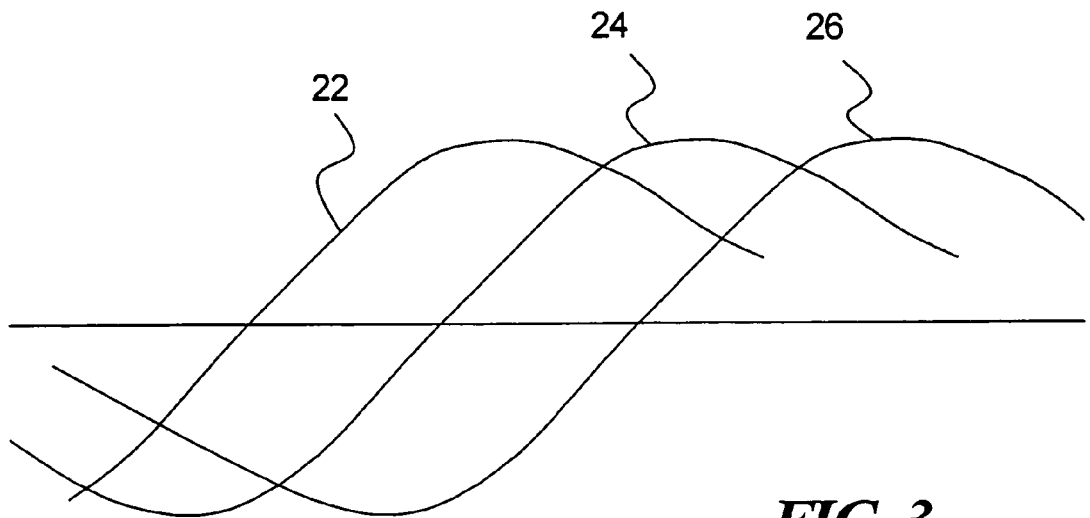

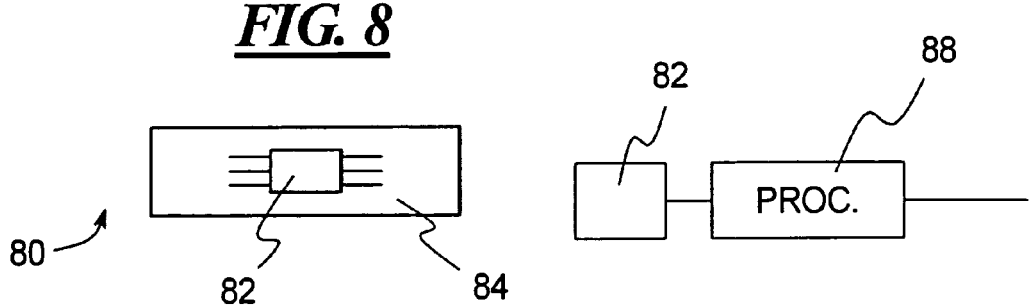
FIG. 8
FIG. 10
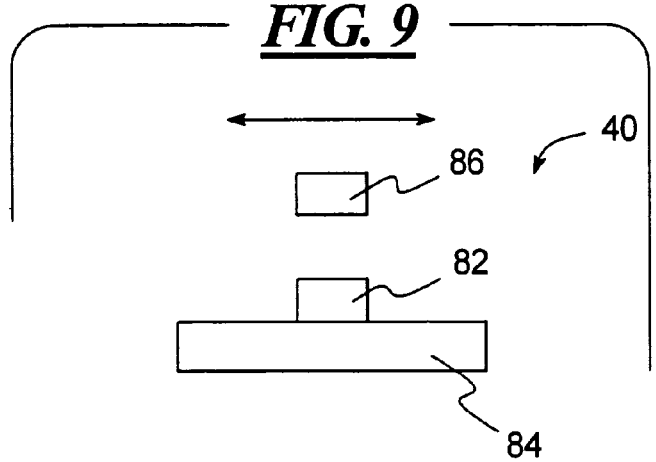
FIG. 9
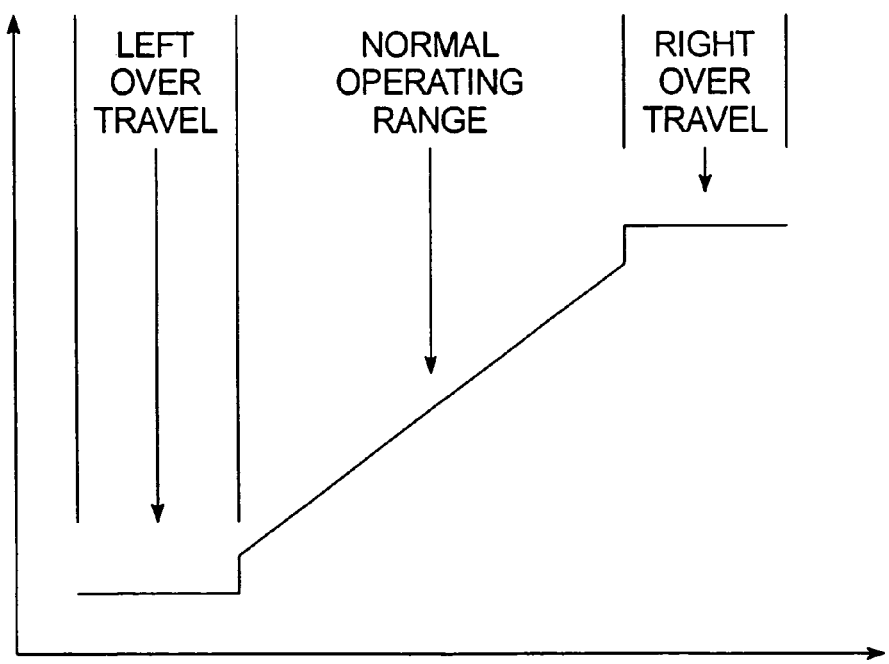
FIG. 11

MAGNETORESISTIVE SMART SWITCH

RELATED APPLICATION

This application is a continuation of U.S. application Ser. No. 10/294,105 filed Nov. 14, 2002 now U.S. Pat. No. 6,960,974.

TECHNICAL FIELD OF THE INVENTION

The present invention relates to a highly reliable switch that has no contact with a moving object and that is capable of detecting its own failure and/or over travel range.

BACKGROUND OF THE INVENTION

Switches are used in a variety of applications to control the on and off states of loads, to sense the proximity or position of input devices, to provide inputs to data processing systems, and so on. Many of these applications involve complex systems, such as those used on aircraft or oil wells, which rely on a large number of switches. Many of these switches experience intensive use in these systems and, as a result, fail because their parts simply wear out. Switches can also fail because they are driven or otherwise travel out of range.

Many of the switches used in complex systems provide critical functions. When a switch that provides a critical function fails, the failure can result in a potentially dangerous and/or economically costly condition. Therefore, when such a switch fails, it is important to replace it as soon as possible in order to avoid or minimize the potentially dangerous and/or economically costly condition. However, when a switch fails in a complex system, it can be very difficult to locate it so that it can be replaced.

The switch of the present invention is a non-contact position sensor with a built in self-diagnostic system. The self diagnostic system can indicate that the switch travel out of range and/or that the switch is not functioning properly. This switch has less wear because it does not contact the object that it is sensing, and there is less chance that this switch will travel out of range. Therefore, the switch of the present invention has a longer life. Also, this switch detects when it has failed so that it can be easily located and replaced.

SUMMARY OF THE INVENTION

In accordance with one aspect of the present invention, a smart switch comprises a magnetic operator, at least one magnetic sensor located to sense movement of the magnetic operator, and a processor arranged to process an output of the magnetic sensor so as to detect an over travel range and a normal operating range of the magnetic operator.

In accordance with another aspect of the present invention, a smart switch comprises a magnetic operator, first, second, and third magnetoresistive sensors located to sense movement of the magnetic operator, and a processor arranged to process outputs of the first, second, and third magnetoresistive sensors so as to detect right and left over travel ranges and a normal operating range of the magnetic operator.

In accordance with still another aspect of the present invention, a smart switch comprises a magnetic operator, a single magnetoresistive sensor located to sense movement of the magnetic operator, and a processor arranged to process an output of the single magnetoresistive sensor so as to detect an over travel range and a normal operating range of the magnetic operator.

BRIEF DESCRIPTION OF THE DRAWINGS

These and other features and advantages will become more apparent from a detailed consideration of the invention when taken in conjunction with the drawings in which:

FIGS. 1 and 2 illustrate a smart switch according to one embodiment of the present invention;

FIG. 3 illustrates the voltage versus position outputs of the individual magnetoresistive sensors that are included in the smart switch of FIGS. 1 and 2;

FIGS. 8 and 9 illustrate a smart switch according to another embodiment of the present invention;

FIG. 10 illustrates an apparatus for processing the output of the smart switch shown in FIGS. 8 and 9; and, FIG. 11 illustrates the detection ranges provided by the smart switch of FIGS. 8 and 9.

DETAILED DESCRIPTION

Figure 4:
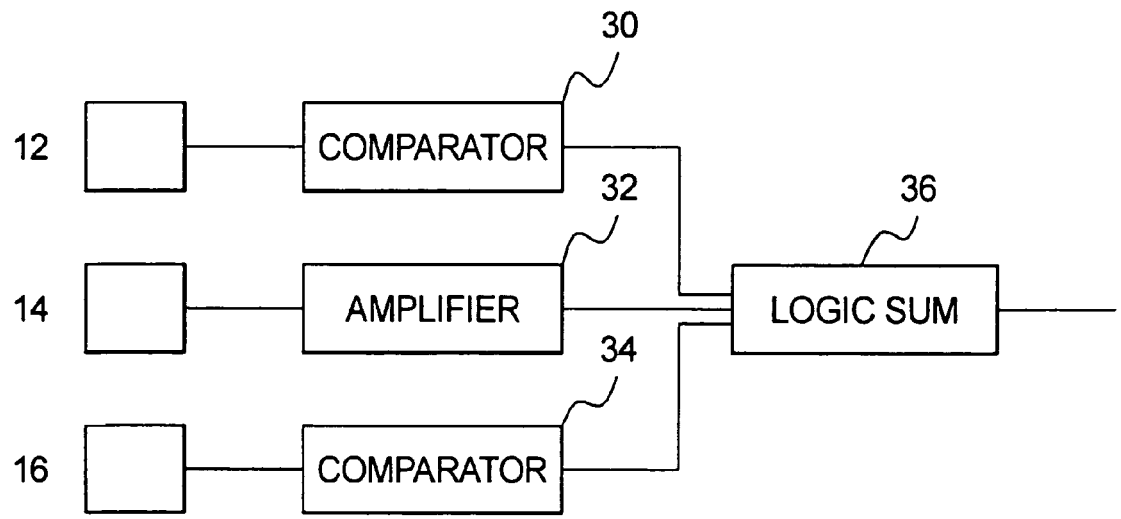
FIG. 4 illustrates an analog apparatus for processing the outputs shown in FIG. 3.

As shown in FIGS. 1 and 2, a switch 10 according to one embodiment of the present invention includes three magnetoresistive sensors 12, 14, and 16 mounted on a mounting surface 18. The magnetoresistive sensor 14 is located between the magnetoresistive sensors 12 and 16, and the magnetoresistive sensors 12 and 16 are positioned on either side of the magnetoresistive sensor 14. The magnetoresistive sensors 12, 14, and 16 sense the position of a switch operator 20, such as an actuator, a door, an oscillating shaft, etc., as the switch operator 20 moves over the magnetoresistive sensors 12, 14, and 16 in the direction shown by the double ended arrow of FIG. 2.

As the switch operator 20 passes over it, each of the magnetoresistive sensors 12, 14, and 16 is mounted on the mounting surface 18 so as to produce a corresponding one of the voltage outputs 22, 24, and 26 shown in FIG. 3. Accordingly, the magnetoresistive sensor 12 produces the voltage output 22, the magnetoresistive sensor 14 produces the voltage output 24, and the magnetoresistive sensor 16 produces the voltage output 26.

For example, each of the magnetoresistive sensors 12, 14, and 16 may be a HMC1501 or HMC1512 supplied by Honeywell International, the magnetoresistive sensors 12 and 14 may be separated on the mounting surface 18 by a distance of 2-40 mm, and the magnetoresistive sensors 14 and 16 may be separated on the mounting surface 18 by the same distance. Also, the switch operator 20, for example, may be a magnet or other magnetic field generating device. Given these devices and distances, the magnetoresistive sensors 12, 14, and 16 produce the voltage outputs 22, 24, and 26 relative to the travel of the switch operator 20 along the mounting surface 18 from one end to another.

Figure 5:
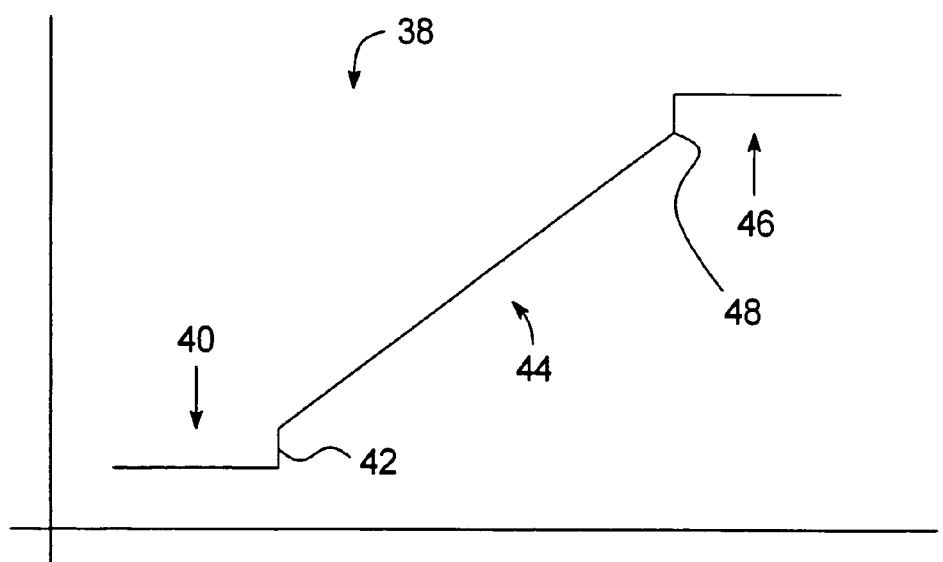
FIG. 5 illustrates a waveform produced by the analog apparatus of FIG. 4.

As shown in FIG. 4, the voltage output 22 from the magnetoresistive sensor 12 is supplied to a comparator 30, the voltage output 24 from the magnetoresistive sensor 14 is supplied to an amplifier 32, and the voltage output 26 from the magnetoresistive sensor 16 is supplied to a comparator 34. The outputs of the comparator 30, the amplifier 32, and the comparator 34 are added by a logical gate 36 to produce the waveform 38 shown in FIG. 5. FIG. 5 shows the output of the logical gate 36 as a function of travel of the switch operator 20 over the limited range offered by the magnetoresistive sensors 12, 14, and 16.

The comparator 30 has a threshold set so that it switches on when the voltage output 22 is below a first threshold, such as 0.05 volt, so as to provide an output at a level 40 of the waveform 38. The signal from the amplifier 32 at this point is comparatively smaller than a predetermined value so that the logical gate 36 passes the level 40 and none of the outputs from the amplifier 32 and the comparator 34.

As the voltage output 22 rises sufficiently, the comparator 30 switches off at a point 42. Because the comparator 34 is still off at this point, only the output of the amplifier passes through the logical gate 36. Accordingly, only the amplified voltage output 24 contributes to the output of the logical gate 36. The output of the logical gate 36 during the time that both the comparator 30 and the comparator 34 are off is the portion 44 of the waveform 44.

The comparator 34 has a threshold set so that it switches on when the voltage output 26 is sufficiently large so as to provide an output at a level 46 of the waveform 38. The signal from the amplifier 32 at this point 48 is now comparatively smaller than the level 46 so that the logical gate 36 passes the level 46 and none of the output from the amplifier 32 and the comparator 30. Accordingly, the output of the logical gate 36 holds at the level 46.

Figure 6:
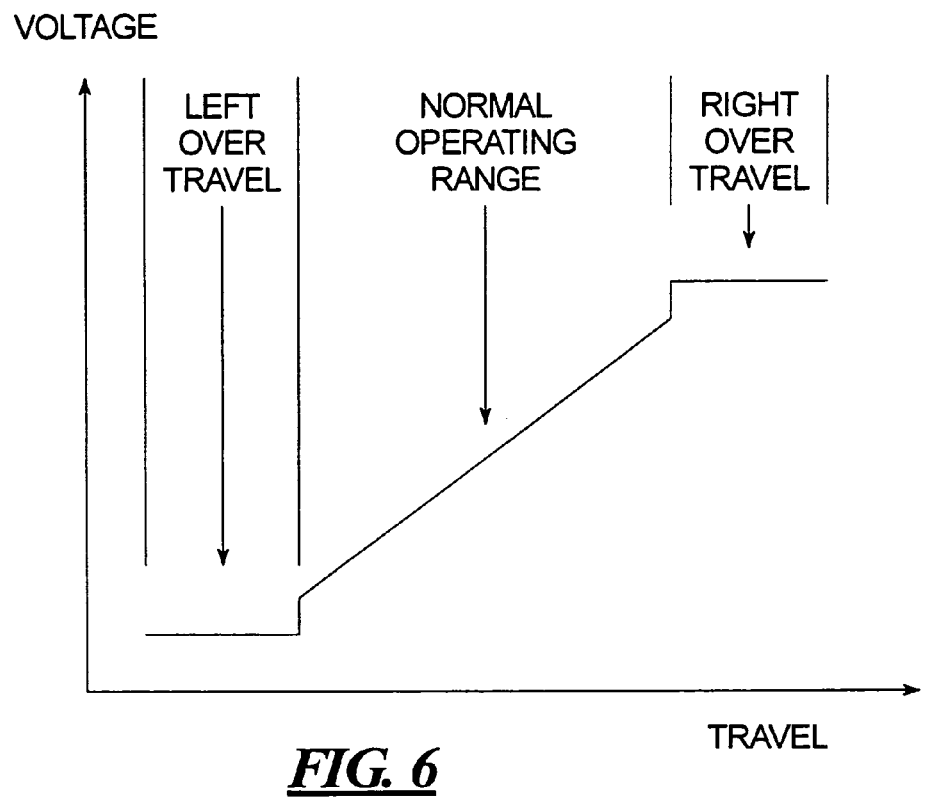
FIG. 6 illustrates the detection ranges of the waveform shown in FIG. 5.

FIG. 6 illustrates that the waveform 38 may be broken into a left over travel range to indicate that the switch operator 20 has traveled too far to the left, a right over travel range to indicate that the switch operator 20 has traveled too far to the right, a normal operating range between the left over travel range and the right over travel range. Also, one or more points in the normal operating range of the output shown in FIG. 7 can be used to indicate position of the switch operator 20. For example, these points can be used to determine whether an actuator is in one or more predetermined positions, whether a door is open or shut, whether an oscillating shaft has traveled to one or more predefined positions, etc.

Figure 7:
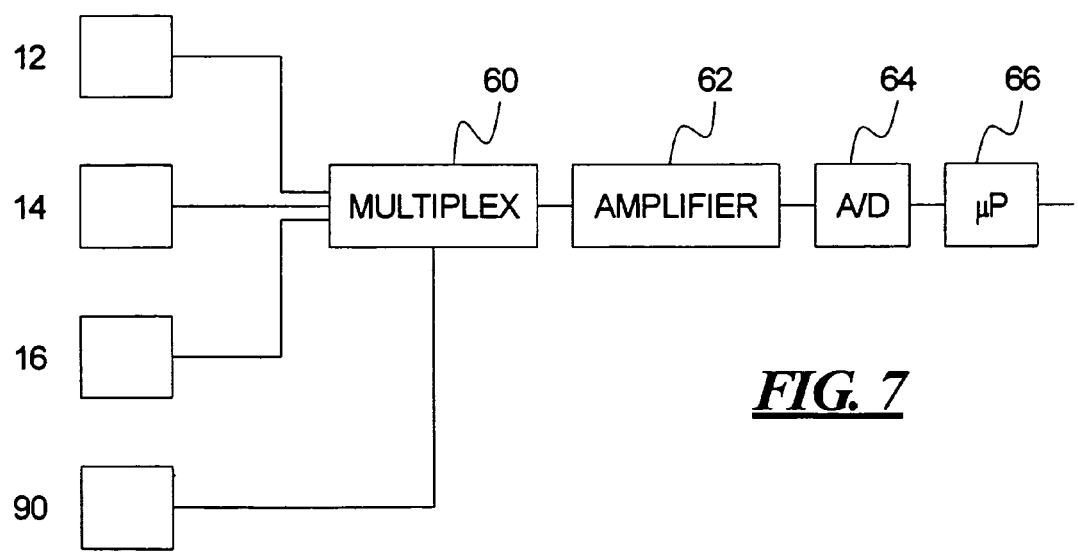
FIG. 7 illustrates a digital apparatus for processing the outputs shown in FIG. 3.

FIG. 4 illustrates an analog approach to processing the voltage outputs 22, 24, and 26. Alternatively, FIG. 7 illustrates a digital approach to processing the voltage outputs 22, 24, and 26. The voltage output 22 from the magnetoresistive sensor 12, the voltage output 24 from the magnetoresistive sensor 14, and the voltage output 26 from the magnetoresistive sensor 16 are multiplexed by a multiplexer 60. The output from the multiplexer 60 is amplified by an amplifier 62 and converted to a digital signal by an analog-to-digital converter 64. The digital signal from the analog-to-digital converter 64 is then processed by a microprocessor 66 to produce the waveform 38 shown in FIG. 5.

Additionally, when the output from the switch 10 below a predetermine threshold is detected, or when the outputs from the three magnetoresistive sensors 12, 14, and 16 do not follow the expected pattern, it can be determined that the magnet or other magnetic field generating device of the switch operator 20 has fallen off of the actuator, or that the switch operator 20 has otherwise malfunctioned, or that the switch 10 has become disconnected from its processing circuit such as shown in FIG. 4 or 7.

As shown in FIGS. 8 and 9, a switch 80 according to another embodiment of the present invention includes a single magnetoresistive sensor 82 mounted on a mounting surface 84. The magnetoresistive sensor 82 is used to sense the position of a switch operator 86. As shown in FIG. 10, a processor 88 may be used to shape the output of the magnetoresistive sensor 82 so that this output has the general appearance of the curve of FIG. 11. The processor 88 may be microprocessor based as shown in FIG. 7, or have two comparators, an amplifier, and logical gate as shown in FIG. 4, or other devices arranged to profile the output of the magnetoresistive sensor 82 according to the shape shown in FIG. 11.

As shown in FIG. 11, the output of the magnetoresistive sensor 82 can be used to determine whether the switch operator 86 has traveled too far to the right or left. Also, one or more points in the normal range of the output of the magnetoresistive sensor 82 can be used to indicate position of the switch operator 86. For example, these points can be used to determine whether an actuator is in one or more predetermined positions, whether a door is open or shut, whether an oscillating shaft has traveled to one or more predefined positions, etc.

Additionally, by detecting that the output from the magnetoresistive sensor 82 is below a predetermine threshold, or when the output from the magnetoresistive sensor 82 does not follow the expected pattern, the processor 88 can determine that the magnet or other magnetic field generating device has fallen off of the switch operator 86, or that the switch operator 86 has otherwise malfunctioned, or that the switch 80 has become disconnected from the processor 88.

The embodiment illustrated in FIGS. 8-11 has the advantage of simplicity and lower cost. However, the overall range (voltage versus position) from the left over travel range through the normal operating range to the right over travel range is shorter than the overall range of the embodiment illustrated in FIGS. 1-7.

Certain modifications of the present invention have been described above. Other modifications of the present invention will occur to those practicing in the art of the present invention. For example, instead of using the microprocessor 66 to process the signal shown in FIG. 7, other processors such as ASICs may be used to process the voltage outputs 22, 24, and 26. Similarly, an ASIC or other device or logic array may comprise the processor 8.

Moreover, the outputs of the magnetoresistive sensors 12, 14, and 16 may be processed by apparatus other than that specifically described above in order to process the voltage outputs 22, 24, and 26 and to detect over travel, magnet loss, or other failures of the switch 10.

Also, it is also possible to use more than three sensors in order to extend the travel range. In this case, the outputs from the middle sensors can be combined and the processor can be used to determine the position.

Furthermore, the processing arrangements shown in FIGS. 4 and 7 may be high temperature processing arrangement to improve reliability.

In addition, the switch 10 is described above as including magnetic sensors in the form of the magnetoresistive sensors 12, 14, and 16. Instead, these magnetic sensors may be other types of magnetic sensors such as anisotropic magnetoresistive sensors, giant magnetoresistive sensors, Hall sensors, etc. Similarly, the magnetoresistive sensor 82 may be an anisotropic magnetoresistive sensor, a giant magnetoresistive sensor, a Hall sensor, etc.

Moreover, temperature compensation may be provided for the switches described above. For example, the microprocessor 66 may store a number of temperature coefficients that are accessed depending on the temperature of the switch as sensed by a temperature sensor 90 shown in FIG. 7 coupled to the multiplexer 60. Accordingly, one of the temperature coefficients corresponding to the temperature sensed by the temperature sensor 90 is accessed by the microprocessor 66 and is used by the microprocessor 66 to characterize the output of the magnetoresistive sensors 12, 14, and 16. In this manner, the effect of temperature on the outputs of the magnetoresistive sensors 12, 14, and 16 may be minimized. Temperature compensation may similarly be applied in the case of the circuit shown in FIG. 10.

Accordingly, the description of the present invention is to be construed as illustrative only and is for the purpose of teaching those skilled in the art the best mode of carrying out the invention. The details may be varied substantially without departing from the spirit of the invention, and the exclusive use of all modifications which are within the scope of the appended claims is reserved.

We claim:

1. A smart switch comprising:
a magnetic operator;
at least one magnetic sensor located to sense relative movement between the magnetic operator and the at least one magnetic sensor; and,
a processor arranged to process an output of the at least one magnetic sensor so as to detect whether the magnetic operator has entered at least one of a first over travel range, a second over travel range, and a normal operating range, wherein the first over travel range is a left over travel range and the second over travel range is a right over travel range and wherein the processor is arranged to process the output so that the output has a substantially flat left over travel voltage versus position range, a substantially flat right over travel voltage versus position range, and a sloped normal operating voltage versus position range between the substantially flat left over travel voltage versus position range and the substantially flat right over travel voltage versus position range.

2. The smart switch of claim 1 wherein the at least one magnetic sensor comprises at least one magnetoresistive sensor.

3. The smart switch of claim 1 wherein the processor comprises an analog processor.

4. The smart switch of claim 3 wherein the first over travel range is a left over travel range and the second over travel range is a right over travel range and wherein the processor is arranged to process the output so that the output has a substantially flat left over travel voltage versus position range, a substantially flat right over travel voltage versus position range, and a sloped normal operating voltage versus position range, and a sloped normal operating voltage versus position range between the substantially flat left over travel voltage versus position range and the substantially flat right over travel voltage versus position range.

5. The smart switch of claim 1 wherein the processor comprises a digital processor.

6. The smart switch of claim 5 wherein the first over travel range is a left over travel range and the second over travel range is a right over travel range and wherein the processor is arranged to process the output so that the output has a substantially flat left over travel voltage versus position range, a substantially flat right over travel voltage versus position range, and a sloped normal operating voltage versus position range between the substantially flat left over travel voltage versus position range and the substantially flat right over travel voltage versus position range.

7. The smart switch of claim 5 wherein the digital processor comprises a microprocessor.

8. The smart switch of claim 7 wherein the first over travel range is a left over travel range and the second over travel range is a right over travel range and wherein the processor is ranged to process the output so that the output has a substantially flat left over travel voltage versus position range, a substantially flat right over travel voltage versus position range, and a sloped normal operating voltage versus position range between the substantially flat left over travel voltage versus position range and the substantially flat right over travel voltage versus position range.

9. The smart switch of claim 1 wherein the processor comprises an ASIC.

10. A smart switch comprising:
a magnetic operator;
a single magnetoresistive sensor located to sense movement of the magnetic operator; and,
a processor arranged to process an output of the single magnetoresistive sensor so as to detect whether the magnetic operator has entered at least one of a first over travel range, a second over travel range, and a normal operating range, wherein the first over travel range is a left over travel range and the second over travel range is a right over travel range and wherein the processor is arranged to process the output of the single magnetoresistive sensor so as to detect a right over travel range of the magnetic operator, a left over travel range of the magnetic operator, and a normal operating range of the magnetic operator.

11. The smart switch of claim 10 wherein the processor is arranged to process the output of the single magnetoresistive sensor so that the output has a substantially flat left over travel voltage versus position range, a substantially flat right over travel voltage versus position range, and a sloped normal operating voltage versus position range between the substantially flat left over travel voltage versus position range and the substantially flat right over travel voltage versus position range.

12. The smart switch of claim 11 wherein the processor comprises first and second comparators to produce the substantially flat left over travel voltage versus position range and the substantially flat right over travel voltage versus position range.

13. The smart switch of claim 10 wherein the processor is arranged to determine a failure when the processor detects that the output from the single magnetoresistive sensor is below a predetermined threshold.

14. The smart switch of claim 10 wherein the processor comprises a microprocessor.

15. The smart switch of claim 10 wherein the processor comprises and ASIC.

16. The smart switch of claim 10 wherein the processor is arranged to provide temperature compensation to an output of the single magnetoresistive sensor.

17. A smart switch comprising:
at least one magnetic sensor located to sense movement relative to an object; and,
a processor coupled to the at least one magnetic sensor arranged to produce an output indicating first and second over travel ranges separated by a normal operating range of the object, wherein the first and second over travel ranges comprises corresponding substantially flat portions of the output, and wherein the normal operating range comprises a substantially sloped portion of the output.

18. The smart switch of claim 17 wherein the object comprises a magnetic operator.

19. The smart switch of claim 17 wherein the first and second over travel ranges comprises corresponding substantially flat portions of the output, and wherein the normal operating range comprises a substantially sloped portion of the output.

20. The smart switch of claim 17 wherein the at least one magnetic sensor comprises first, second, and third magnetic sensors located so as to sense movement of the object, wherein the processor is responsive to the first, second, and third magnetic sensors so that the output comprises the first and second over travel ranges separated by the normal operating range.

21. The smart switch of claim 20 wherein the first and second over travel ranges comprises corresponding substantially flat portions of the output, and wherein the normal operating range comprises a substantially sloped portion of the output.

* * * * *